(12) United States Patent
Graham

(10) Patent No.: US 6,365,700 B1
(45) Date of Patent: Apr. 2, 2002

(54) HIGH GREEN STRENGTH REACTIVE HOT MELT BY A PREPOLYMERIZATION IN THE MAIN REACTOR

(75) Inventor: Malcolm Graham, Old Windsor (GB)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/326,855

(22) Filed: Jun. 7, 1999

(51) Int. Cl.$^7$ ................................................ C08G 18/10
(52) U.S. Cl. ............................ 528/60; 528/65; 528/83; 525/440; 525/458
(58) Field of Search ............................ 528/60, 65, 83; 525/440, 458

(56) References Cited

U.S. PATENT DOCUMENTS

| | | | | |
|---|---|---|---|---|
| 3,770,555 A | * | 11/1973 | Gladstone | ............... 525/458 |
| 4,413,111 A | * | 11/1983 | Markusch | ............... 528/59 |
| 4,704,445 A | * | 11/1987 | Komiya | ............... 528/49 |
| 5,068,143 A | * | 11/1991 | Agger et al. | ............... 428/241 |
| 5,162,457 A | * | 11/1992 | Hansel | ............... 525/454 |

FOREIGN PATENT DOCUMENTS

GB   1554102   * 10/1979

* cited by examiner

*Primary Examiner*—Rachel Gorr
(74) *Attorney, Agent, or Firm*—Cynthia L. Foulke

(57) ABSTRACT

It has been found, in accordance with the present invention, that a high molecular weight polyester, when reacted with a poly or diisocyanate in an NCO:OH ratio of 0.7:1 to 1:0.7, produces a high molecular weight hydroxy terminated prepolymer which is stirrable above 120° C. and sufficiently stable prior to reaction with additional di or polyisocyanate or optional additional polyols to produce a reactive hot melt adhesive.

5 Claims, 2 Drawing Sheets

HIGH GREEN STRENGTH REACTIVE HOT MELT BY A PREPOLYMERIZATION IN THE MAIN REACTOR

FIELD OF THE INVENTION

The present invention is directed to high green strength reactive hot melt adhesives prepared from, in the first step of the reaction, a high molecular weight hydroxy terminated polyester prepolymer which will crystallize at a useful temperature and generate tough, fast setting properties in the uncured adhesive.

BACKGROUND OF THE INVENTION

Reactive hot melts are one-component, 100% solids, solvent-free urethane prepolymers. Unlike conventional hot melts that can be repeatedly heated from its solid state and flowed to a liquid form, the reactive hot melt behaves as a thermoset and goes through an irreversible chemical reaction once dispensed in the presence of ambient moisture.

The reactive hot melts are isocyanate terminated prepolymers that react with surface or ambient moisture in order to chain-extend, forming a new polyurethane polymer which offers performance superior to that obtained with conventional hot melts.

These reactive hot melts will bond to a variety of substrates including plastics, woods, fabrics and some metals making them ideal candidates for bonding dissimilar substrates. Moreover, they are flexible and durable by nature, so they may be used in extreme temperature ranges of −30 to +150° C. while providing excellent moisture and chemical resistance.

High molecular weight polymers, typically polycaprolactone, $HO[(CH_2)_5OCO]_nH$, or copolymers containing polycaprolactone, can be added as preformed polymers in a granular state to low molecular weight polyesters, polyethers or mixture of polyesters and polyethers prior to reaction with a diisocyanate to form a polyurethane hot melt adhesive. The advantage of adding a high molecular weight polymer with crystallizing properties is the generation of high uncured green strength. When a crystalline polymer is included, the crystallization is usually suppressed by reduced polymer mobility in the matrix. For these reasons, polycaprolactone, a polymer which retains its crystalline properties, is the best choice. However the high molecular weight needed to obtain useful properties results in a very high viscosity polymer which can only be practically used in granular form.

SUMMARY OF THE INVENTION

Figure 1:
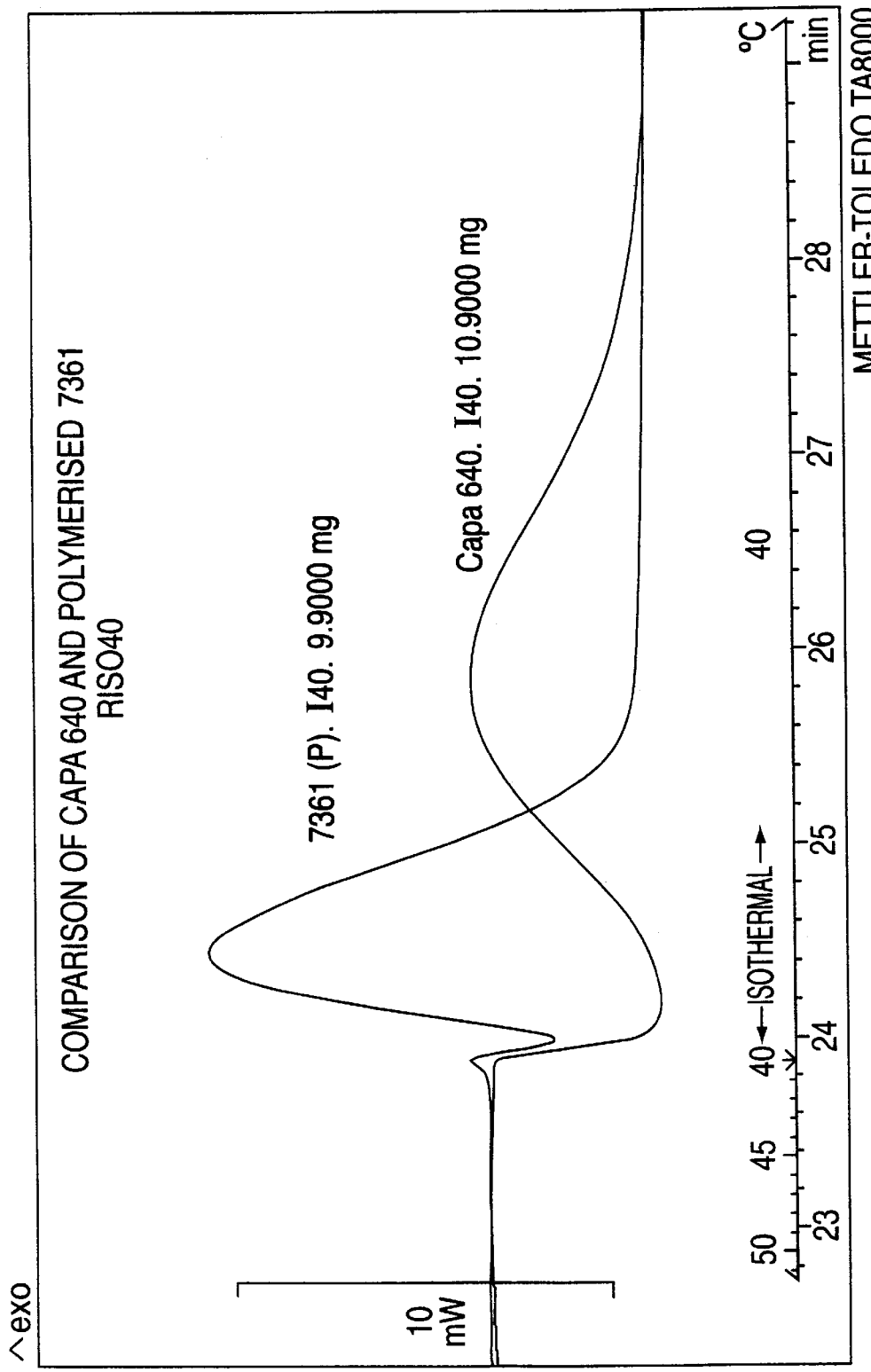
FIG. 1 is an exotherm cooling curve comparing the cooling to 40° C. of a polyurethane prepolymer in accordance with the present invention, and CAPA 640, a caprolactone from Solvay.

It has been found, in accordance with the present invention, that a high molecular weight polyester, when reacted with a poly or diisocyanate in an NCO:OH ratio of 0.7:1 to 1:0.7, produces a high molecular weight prepolymer which is stirrable above 120° C. and sufficiently stable prior to reaction with additional di or polyisocyanates or optional additional polyols to produce a reactive hot melt adhesive.

It has been found in accordance with the present invention, that starting with a low molecular weight polyester, which can be polymerized to the desired higher molecular weight in the reactor, eliminates the need to use granules and the associated cost of granulation.

DESCRIPTION OF THE INVENTION

The present invention is directed to reactive hot melt adhesives with high green strength which are prepared from a high molecular weight polyester based prepolymer.

The prepolymer is an hydroxy terminated prepolymer prepared from a high molecular weight polyester and a poly or diisocyanate.

The high molecular weight polyester preferably is hexane diol adipate which is an hydroxy terminated polyester prepared by the reaction of a hexane diol and adipic acid. Preferably the hexane diol adipate polyester has a molecular weight greater than 3600, most preferably greater than 7000 or 10,000. Examples of commercially available hexane diol adipates include DYNACOLL 7360 with molecular weights of 3600 or DYNACOLL 7361 with molecular weight of 7000 all of which are available from Hüls. Higher melting point polyesters can also be used based on hexane diol dodecanedioic acid such as DYNACOLL 7380 or 7381 based on hexane diol azeleic acid. The molecular weight of the DYNACOLLs are calculated from hydroxyl numbers. Although hexane diol adipate with molecular weight of 3600 can be used, the resulting product will not have the preferred properties obtained with the higher molecular weight compounds. Preferred is DYNACOLL 7361 which when polymerized crystallizes rapidly at 40 to 50° C. to give a tough elastomer.

In most applications, there is a requirement for rapid strength development over a range of ambient temperatures up to 40° C. A hexane diol/adipatic acid polyester starts to crystallize in the region of 40° C. and is the prime choice. The 7200 molecular weight polymer is the best commercially available polyester although molecular weights in the range of 2000 to 15,000 will work as well. An alternative would be a pure polyester based on hexane diol/adipic acid of a suitable high molecular weight (30,000 to 60,000) to create green strength, but this polyester would be made in a separate reactor and manufactured as granules.

The polyester is reacted with a poly or diisocyanate to produce an hydroxy terminated prepolymer. This step is called the first stage. If the molecular weight of the polyester is too high, mixing can be difficult and the efficiency of the mixing at the diisocyanate addition phase becomes critical. It has been found, that if the polyester and the diisocyanate are reacted in an NCO:OH ratio of 0.7:1.0 to 1:0.7, a high molecular weight prepolymer which is stirrable above 120° C. and sufficiently stable prior to the addition of second stage polyols in the reaction can be formed. By contrast, if a lower molecular weight hydroxyl terminated polyester is used, i.e., one with a molecular weight of 3600, such as DYNACOLL 7360, in a similar NCO:OH ratio, the viscosity of the resulting prepolymer is too high for efficient mixing because of the higher concentration of urethane groups.

It is preferred to make the hydroxyl terminated prepolymer by using an excess of poly or diisocyanate. Post addition polyols can then be added, and any water removed by vacuum stripping without the complication of the post addition polyols reacting with the isocyanate terminated prepolymer, or any water in the post addition polyols reacting with the isocyanate.

Suitable di or polyisocyanates for use in preparing the prepolymer are selected from the group consisting of ethylene diisocyanate; ethylidene diisocyanate; propylene diisocyanate; 1-(1-iosyanato-1-methylethyl)-3-(1-ethenyl) benzene ("m-TMI"); methylene-bis-(4-cyclohexyliocayante) ("HMDI"); 4,4'diphenylmethane diisocyanate ("4,4'MDI"), and isomers thereof; isophorone diisocyanate ("IPDI"), 3-isocyanatomethyl-3,5,5-trimethylcyclohexyl isocyanate; 3-isocyanatomethyl-3,5,5-trimethylcyclohexyl isocyanate cyanurate; butylene diisocyanate; hexamethylene diisocyanate; toluene diisocyanate ("TDI"); cyclopentylene-1,3,-diisocyanate; cyclohexylene-1,4-diisocyanate; cyclohexylene-1,2-diisocyanate; 4,4'-diphenylmethane diisocyanate; 2,2-diphenylpropane-4,4'-diisocyanate; p-phenylene diisocyanate; m-phenylene diisocyanate; xylene diisocyanate; 1,4-naphthylene diisocyanate; 1,5-naphthylene diisocyanate; diphenyl-4,4'-diisocyanate; azobenzene-4,4'-diisocyanate; diphenylsulphone-4,4'-diisocyanate; dichlorohexamethylene diisocyanate; furfurylidene diisocyanate; 1-chlorobenzene-2,4-diisocyanate; 4,4',4"-triisocyanatotriphenylmethane; 1,3,5-triisocyanato-benzene; 2,4,6-tri-isocyanato-toluene; ISONATE M143, a modified MDI from Dow, and 4,4'-dimethyldiphenyl-methane-2,2',5,5-tetraisocyanate.

Preferred for use herein are HMDI, 4,4'MDI, TDI and IPDI.

The prepolymers are prepared by premelting the polyhexane diol adipate in a drum, and transferring the melt to a reactor. Water may be removed by heating at greater than 100° C. under vacuum with stirring. The diisocyanate is stirred into the melt, and allowed to react for 30 minutes at 140° C. to form the prepolymer.

Additional optional low molecular weight polyols can then be mixed in with the prepolymer depending on the required end properties. The molecular weights of these polyols are in the range of 50 to 15,000. Again, if necessary, water may be removed by heating at greater then 100° C. under vacuum with stirring. This blend of high molecular weight prepolymer and relatively low molecular weight polyols is then reacted with an excess of diisocyanate to form an isocyanate terminated hot melt adhesive. In this step, the second stage, NCO:OH ratio is 1.2:1 to 3:1, preferably 2:1. A reactive hot melt adhesive with excellent green strength, high tack and very good thermal stability is produced. The content of prepolymer is most useful in the range 30 to 60% and preferably 50 to 60%.

In addition, in the second stage, there may optionally be a post add of additional di or polyisocyanates, e.g., HMDI, 4,4'MDI, TDI, IPDI, crude MDI or IPDI trimmer, to raise the isocyanate level of the multifunctional isocyanate.

Examples of suitable optional polyols for the second stage include those selected from the group consisting of polyester, polyether polyols, polyalkylene polyether polyols, polyacetal polyols, polyamide polyols, polyesteramide polyols, and polythioether polyols. Preferred are polypropylene glycol diols such as VORNANOL P1010 with a molecular weight of 1000 from Dow Chemical Company. There may also be small amounts of triol, such as castor oil or VORNANOL CP255. The preferred polyesters can be amorphous or crystalline such as DYNACOLL 7360, 7361, 7250. The optional second stage hydroxy compounds will be present in amounts of 5 to 70%.

The higher the content of first stage prepolymer the higher the thermal melt stability and green strength of the resulting reactive hot melt adhesive. However, an increase in the content of the first stage prepolymer causes an increase in viscosity. This can be compensated for by using low molecular weight second stage polyols; polyols with molecular weights in the range of 50 to 15,000. In addition, small additions of triol can be used to increase modulus and improve cured high temperature resistance. This is made possible by the dilution effect of the high molecular weight prepolymer giving good thermal stability.

The resulting reactive hot melt adhesives may also contain optional post add ingredients such as a catalyst which will improve the curing speed of the adhesive. Examples of such catalysts include 2,2'-dimorpholinoethyl ether and di (2,6-dimethylmorpholinoethyl)ether catalysts.

The adhesive may also comprise other additional ingredients such as adhesion promoters, diluents, plasticizers and fillers. Other optional ingredients include chain-extension agents, thermoplastic resins, antioxidants, pigments, and UV absorbers.

EXAMPLES

Tensile properties, elastic modulus, stress at yield and elongation at break was measured by coating molten uncured reactive hot melt adhesive onto release paper with a coating block. The dimensions of the strips were measured and the films stretched on an Instron tensometer model 4302.

DSC was measured on a Mettler Toledo DSC 820.

Viscosity was measured on a Brookfield Thermosel at 140° C. with 1 rpm.

Example 1

The properties of a prepolymer made by reacting an hydroxy terminated hexanediol adipate of molecular weight 7200 (DYNACOLL 7361) with 4,4'MDI in an NCO:OH ratio of 0.9:1 were compared with a polycaprolactone with molecular weight of 37,000 (CAPA 640 from Solvay).

The prepolymer was compared to CAPA 640 by measuring the exotherm after cooling to 40° C. The prepolymer takes approximately 1.5 minutes to fully crystallize whereas CAPA 640 takes 4.5 minutes. See FIG. 1. This increased rate offers an advantage where fast setting is required.

Strips of the prepolymer were made by coating the melted prepolymer onto release paper strips. Strips of polycaprolactone were made by coating premelted granules onto release paper. The properties of the resulting adhesives were measured and compared to CAPA 640. The results are shown below:

TABLE 1A

|  | Elastic Mod. (Mpa) | Stress at Yield (Mpa) | Elongation (%) |
|---|---|---|---|
| CAPA 640 | 195 | 14.5 | >1000 |
| Sample 1 | 273 | 9.6 | >800 |

TABLE 1B

|  | Cooling Time to Crystallize at 40° C. (min.) | Cooling Cryst. Onset (° C.) | Delta H (mJ/g) | Melt Peak (° C.) |
|---|---|---|---|---|
| CAPA 640 | 6 | 34 | 64.0 | 55 |
| Sample 1 | 1 | 41 | 66.6 | 56.6 |

Viscosity

| | |
|---|---|
| CAPA 640 | 164,000 mPas |
| Sample 1 | 98,000 mPas |

The tensile properties of the polymer are in the same order as CAPA 640. The crystallization speed is higher.

Example 2

A prepolymer was prepared according to Example 1, using 55 parts of Dynacoll 7361 and 2.0 parts of 4,4'MDI. The prepolymer has a viscosity, as measured on a Brookfield Thermosel at 140° C. with 1 rpm, of 50,000 mPas at 120° C.

To the prepolymer, the following polyols were added and heated under vacuum to a water content of <0.05%:

23.8 parts of DYNACOLL 7360
10.0 parts of VORANOL P1010

The mixed polyols were then reacted with an excess of diisocyanate-9.2 parts of 4,4'MDI and reacted for 30 minutes at 140° C.

The resulting adhesive had a viscosity of 50,000 mPas at 120° C.; and the thermal stability at 120° C. showed a 14% increase in 4 hours.

CARIMED rheology analysis of an uncured sample cooling from 80° C. to 20° C. was compared to a competitive adhesive containing polycaprolactone. The development of G' and G" are almost identical on cooling. See FIG. 2. The right hand absyssa tan-delta is the ratio of loss modulus to the storage modulus. The higher the value, the more liquid the sample. When the value is below 1, the sample is more solid than liquid. The left hand absyssa shows the values for G', the storage modulus, and G" the loss modulus.

Figure 2:
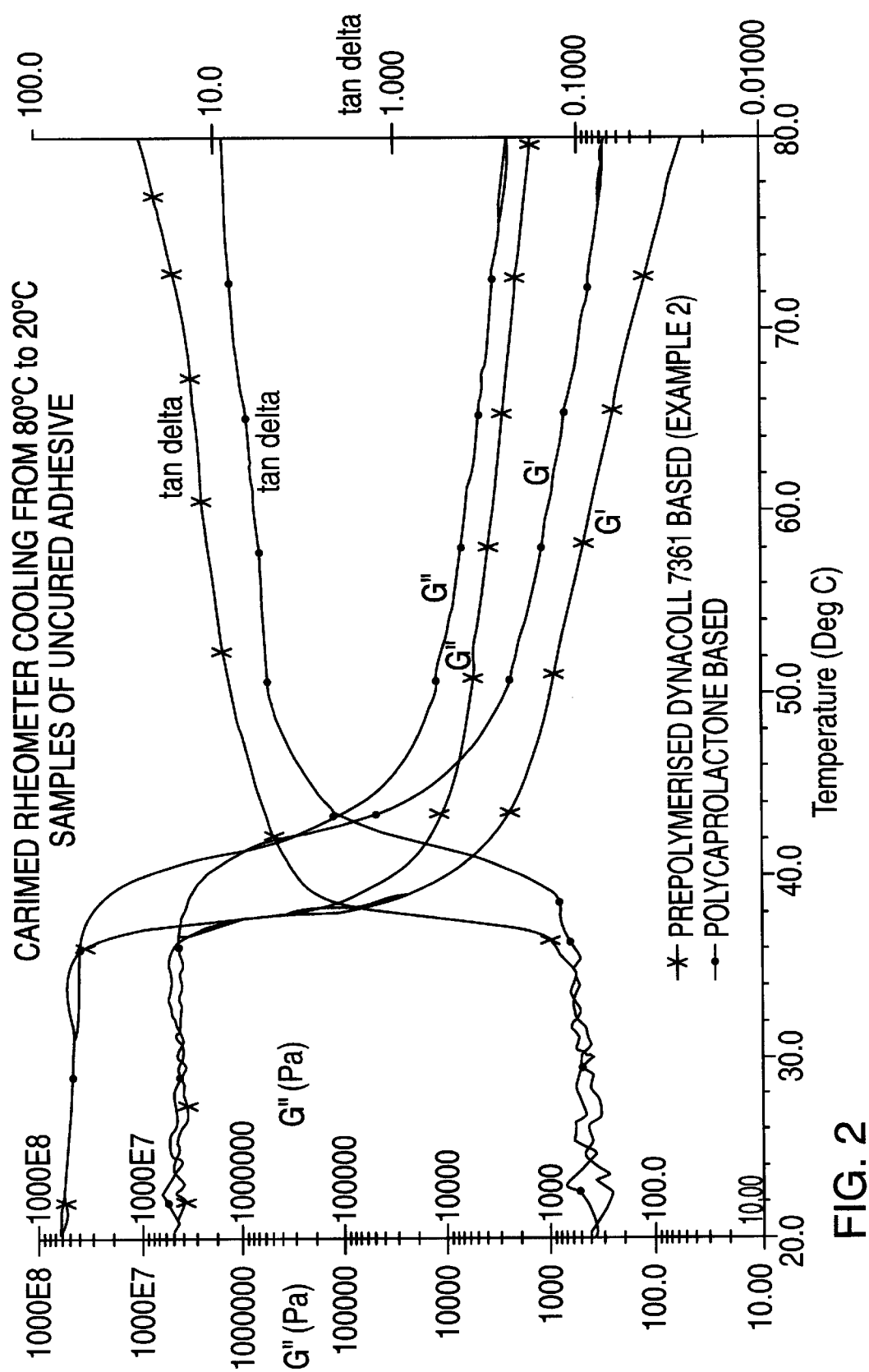
FIG. 2 is a "CARIMED" Rheometer cooling curve from 80° C. to 20° C. of moisture curing reactive polyurethane hot melt adhesives.

As can be seen in FIG. 2, the values for G' and G" are very similar below 36° C., however the onset of crystallization occurs at a higher temperature for the polycaprolactone adhesive. The reason for the difference is the presence of DYNACOLL 7380 which is a higher melting point polyester then DYNACOLL 7360 and crystallizes at a higher temperature. The main observation is that the moduli and the ratio of the moduli are similar showing that the sample with the prepolymer is as tough as a sample containing polycaprolactone.

This adhesive is suitable for profile wrapping where the wrapped foil is under stress. The effect of the tough polymer is to give rapid strength development after lamination.

Example 3

A first stage prepolymer was prepared with 40 parts of DYNACOLL 7361 and 1.0 parts of 4,4'MDI which were combined in the reaction vessel and reacted for 1 hour at 130° C. to 150° C. The NCO/OH ratio was 0.7/1. The prepolymer has a viscosity, as measured on a Brookfield Thermosel at 140° C. with 1 rpm of 18,000 mPas at 120° C.

The following polyols were added to the prepolymer and heated under vacuum to a water content of <0.05%

| | |
|---|---|
| DYNACOLL 7360 | 5.0 |
| DYNACOLL 7380 | 10.0 |
| PPG 1000 | 22.0 |
| ISONATE M143 | 16.7 |

The resulting adhesive had a viscosity of 18,000 mPas at 120° C.

The above properties indicate that this sample is suitable for profile wrapping thinner foil with less residual stress.

What is claimed is:

1. A polyurethane prepolymer prepared by first reacting a hexane diol adipate polyester having a molecular weight greater than 7000 with a polyisocyante or diisocyante in an NCO:OH ratio of 07:1 to 1:0.7, and then reacting a low molecular weight polyol having a molecular weight of 50 to 15,000.

2. The prepolymer of claim 1 wherein the low molecular weight polyols include trifunctional polyols.

3. The polyurethane prepolymer of claim 1 wherein the low molecular weight polyols are selected from the group consisting of polyester, polyether polyols, polyalkylene polyether polyols, polyacetal polyols, polyamide polyols, polyesteramide polyols, polythioether polyols, polypropylene glycols and combinations thereof.

4. An isocyanate terminated reactive hot melt adhesive comprising the prepolymer of claim 1 and additional di or polyisocyanates wherein the prepolymer and additional di or polyicocyanates are in an NCO:OH ratio of 1.2:1 to 3:1.

5. The reactive hot melt adhesive of claim 4 additionally comprising an optional additive selected from the group consisting of 2,2'-dimorpholinethyl ether catalyst, di(2,6-dimethylmorpholinoethyl)ether catalyst, adhesion promoters, diluents, plasticizers, fillers, chain-extension agents, thermoplastic resins, antioxidants pigments, UV absorbers and combinations thereof.

* * * * *